US012447225B2

(12) United States Patent
Voronin et al.

(10) Patent No.: US 12,447,225 B2
(45) Date of Patent: Oct. 21, 2025

(54) ULTRAFAST-UV LASER INTEGRATING CAVITY MEDIATED INACTIVATION OF A PATHOGEN

(71) Applicant: University of South Florida, Tampa, FL (US)

(72) Inventors: Dmitri Voronin, Tampa, FL (US); Shyam Mohapatra, Tampa, FL (US); Subhra Mohapatra, Tampa, FL (US); Sharad Ambardar, Tampa, FL (US); Mark Howell, Tampa, FL (US); Karthick Mayilsamy, Tampa, FL (US)

(73) Assignee: University of South Florida, Tampa, FL (US)

( * ) Notice: Subject to any disclaimer, the term of this patent is extended or adjusted under 35 U.S.C. 154(b) by 572 days.

(21) Appl. No.: 17/850,791

(22) Filed: Jun. 27, 2022

(65) Prior Publication Data

US 2022/0409765 A1 Dec. 29, 2022

Related U.S. Application Data

(60) Provisional application No. 63/202,833, filed on Jun. 25, 2021.

(51) Int. Cl.
*A61L 9/20* (2006.01)
*A61L 2/10* (2006.01)

(52) U.S. Cl.
CPC .................. *A61L 9/20* (2013.01); *A61L 2/10* (2013.01); *A61L 2202/11* (2013.01); *A61L 2209/12* (2013.01)

(58) Field of Classification Search
CPC .......... A61L 9/20; A61L 2/10; A61L 2202/11; A61L 2209/12; A61L 2202/122
See application file for complete search history.

(56) References Cited

U.S. PATENT DOCUMENTS 9,878,064 B2 1/2018 Nagolkin et al.
2021/0369892 A1* 12/2021 Hoboy ................ A62B 18/025

FOREIGN PATENT DOCUMENTS

CA 2567336 A1 11/2010
EP 2455678 A2 5/2012
GB 2530089 A 3/2016
WO WO-2015024094 A1 * 2/2015 .............. A61L 9/20

OTHER PUBLICATIONS

Ambardar et al., “Ultrafast-UV laser integrating cavity device for inactivation of SARS-CoV-2 and other viruses” Sci Rep. Jul. 13, 2022;12(1):11935. doi: 10.1038/s41598-022-13670-8. 10 pages.

* cited by examiner

*Primary Examiner* — Maris R Kessel
*Assistant Examiner* — Aham Lee
(74) *Attorney, Agent, or Firm* — Quarles & Brady LLP; Yakov S. Sidorin

(57) ABSTRACT

Method for increasing efficiency of a pathogen inactivation via enhancing UVC light absorption at such pathogen by multiple diffuse scattering of the light at a wall defining a substantially closed volume, thereby increasing a number of angles at which the pathogen is being irradiate as compared with a direct irradiation of the pathogen with a beam of such light.

6 Claims, 16 Drawing Sheets

FIG. 3A NC
FIG. 3B 0 min
FIG. 3C 0.5 min
FIG. 3D 1 min
FIG. 3E 2 min
FIG. 3F 5 min Cavity FIG. 9A 0 sec
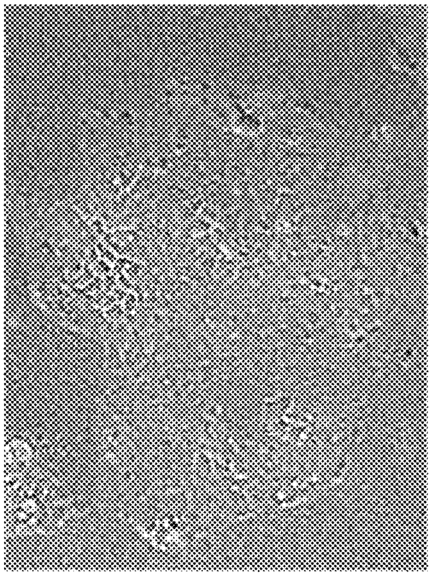
FIG. 9B 60 sec Lamp
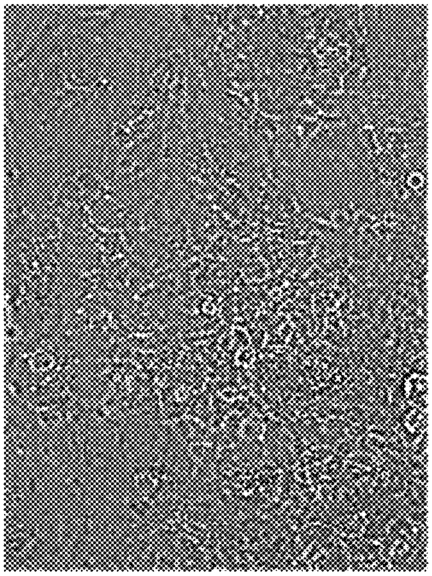
FIG. 9C 1 sec
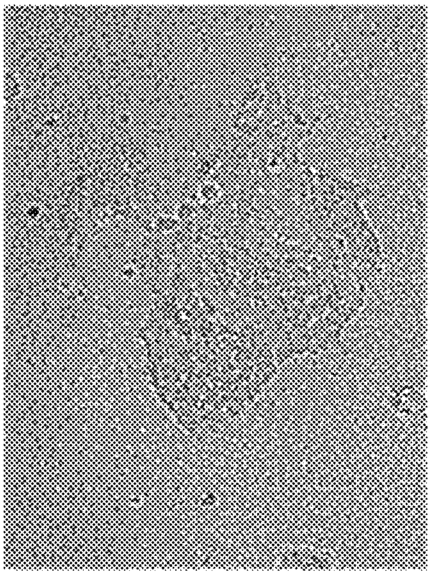
FIG. 9D 5 sec
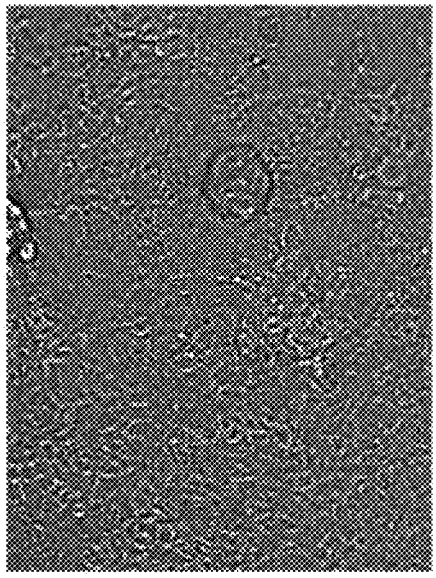
FIG. 9E 10 sec
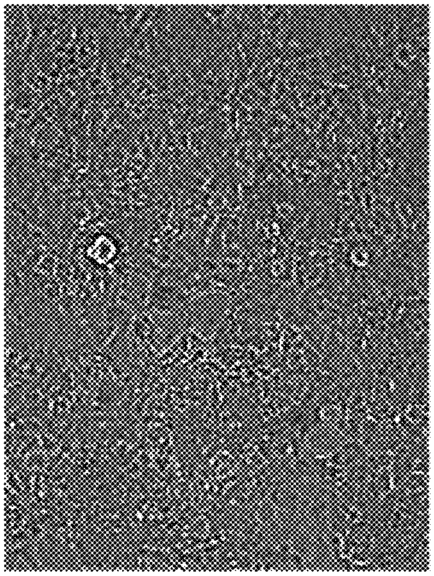
FIG. 9F 30 sec
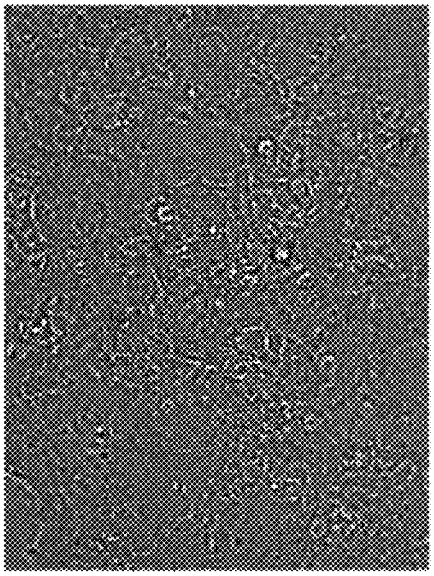

0 sec 1 sec 5 sec 15 sec 200 uM
Direct Exposure

FIG. 11I 0 sec
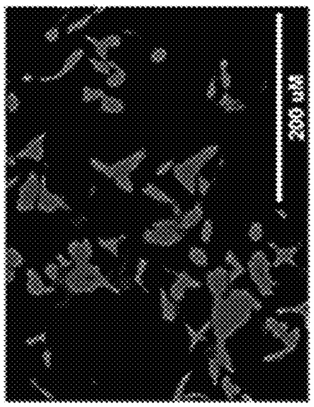
FIG. 11J NC
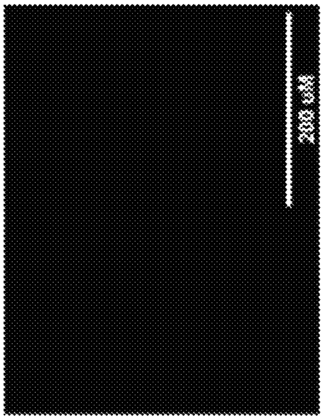
FIG. 11K 10 sec
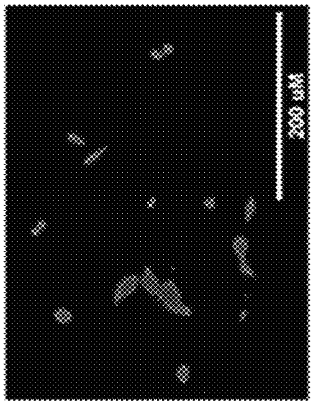
FIG. 11L 60 sec
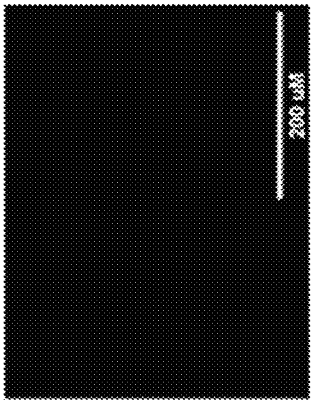
FIG. 11M
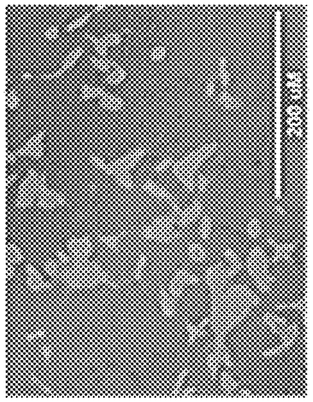
FIG. 11N
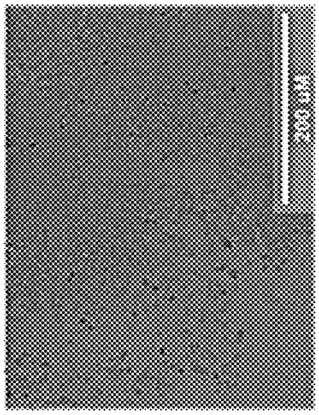
FIG. 11O
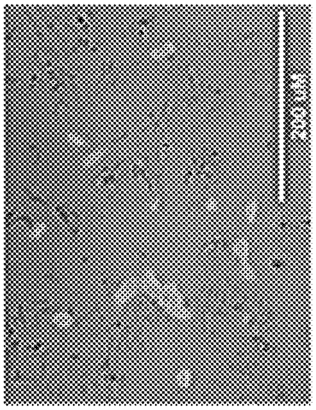
FIG. 11P
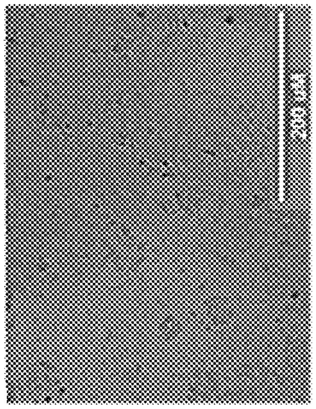
Cavity FIG. 12A 0 min
FIG. 12B UVB 1 min
FIG. 12C UVB 5 min
FIG. 12D UVC 1 min
FIG. 12E UVC 5 min

Stratalinker
FIG. 13A 0 sec
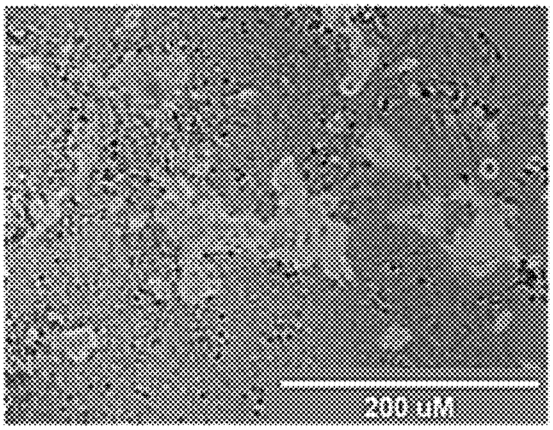
FIG. 13B 5 sec
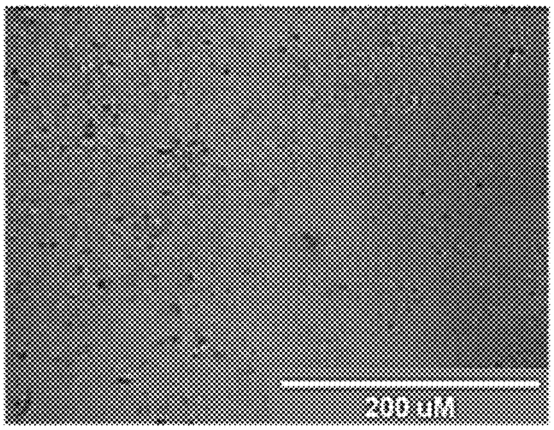
FIG. 13C
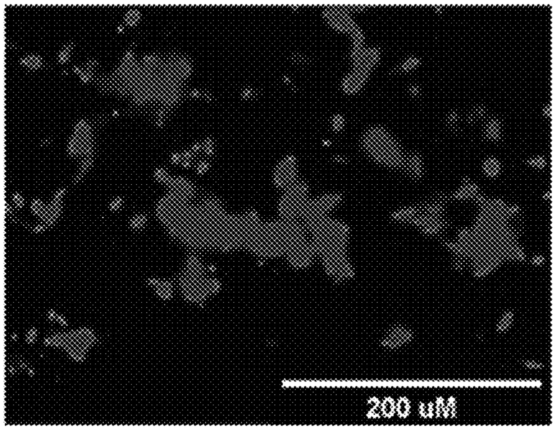
FIG. 13D
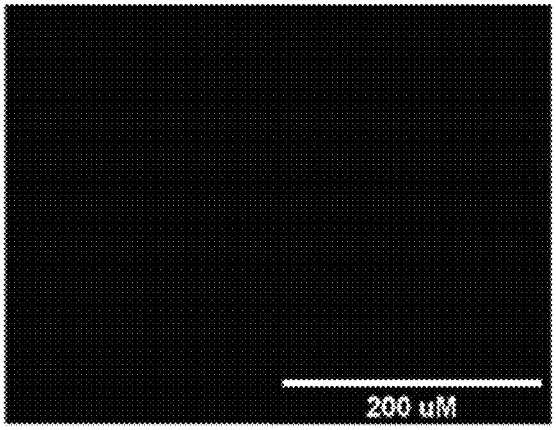

UV-C Wand 0 sec 5 sec

ULTRAFAST-UV LASER INTEGRATING CAVITY MEDIATED INACTIVATION OF A PATHOGEN

CROSS-REFERENCE TO RELATED APPLICATIONS

This US Patent application claims priority from and benefit of a U.S. Provisional Patent Application No. 63/202,833 filed on Jun. 25, 2021, the disclosure of which is incorporated herein by reference.

RELATED ART

The 2020 outbreak of the novel severe acute respiratory-syndrome coronavirus-2 (SARS-CoV-2), which causes coronavirus disease-19 (COVID-19), became a global pandemic, continuing into 2022 and beyond. With over 170 million cases and over 3.5 million deaths worldwide (as of May 2021), COVID-19 led to huge global economic adversities. Hence, it is of utmost urgency to develop rapid and efficient methods to inactivate COVID-19 and other viral particles on surfaces and in the air, especially in public places such as hospitals, airports, stores, etc. against this and future pandemics.

Diverse light-mediated disinfection protocols have been validated for surface, air, and water samples, as well as personal protective equipment. The use of UV irradiation, for example, as an effective, non-contact method of viral pathogen inactivation has been used for a long time, mainly in the form of low-pressure mercury lamps or light emitting diodes (LEDs). UVC light (in the range of 100-280 nm) appears to have the most efficient antimicrobial and antiviral inactivation efficiency among various UV ranges, including UVA (315-400 nm) and UVB (280-315 nm). The maximum absorption of nucleic acids is at about 265 nm, with UVC light causing damage by inducing photochemical fusion of two adjacent pyrimidines into covalently linked dimers, RNA-protein cross-linking, and site-specific molecular damage. Virus inactivation using UV radiation has been explored for the treatment of human enteroviruses (HuEV), zika, hepatitis E, dengue, west nile and others and more recently for SARS-CoV-2. The virucidal efficacy of UV light is influenced by a number of factors, including the target pathogen, environment, and material being decontaminated. Further, germicidal UV has been combined with heat treatment for viral disinfection, including SARS-CoV-2. The problems with UV lamps, however, are well recognized in related art and include limited efficiency, requiring high power and long irradiation times (large doses) which is time-consuming and not suitable for use in many air conditioning systems where the air passes by UV lamp only for very short periods of time. The drawbacks of heating include low efficiency and large heat losses to environment, which require additional cooling efforts and hence increase the cost of inactivation.

Furthermore, while ultrashort laser pulses in the visible (Vis) at 425 nm and near-infrared (NIR) at ~800 nm ranges were also reported to inactivate viruses (here it was suggested that impulsive stimulated Raman scattering resulting in aggregation of viral capsid proteins was the main inactivation mechanism), the inactivation efficiency of the pulsed Vis-NIR irradiation is known substantially lower than germicidal UVC lamps. Pulsed UVB lasers such as nanosecond excimer 308 nm laser were also used for viral inactivation but showed low efficiency similar to Vis-NIR. High efficiencies were obtained using pulsed UVC lasers (such as 193 nm excimer and 266 nm fourth harmonic Nd:YAG). Nanosecond 266 nm UV pulsed laser irradiation revealed the nonlinear two-quantum mechanism of the RNA-protein crosslinking in inactivation of Venezuelan equine encephalomyelitis (VEE) virus with more than one order of magnitude increase of the quantum yield compared to the 254 nm UVC lamp, which can be contrasted with the linear one-photon nature of the conventional pyrimidine dimer formation mechanism which is present in both pulsed UV laser and UV lamp irradiation. On the one hand, pulsed UV laser ablation employs a combination of several mechanisms including thermal and photochemical decomposition that may increase viral inactivation efficiency beyond the conventional UV lamps (UV pulses contain more energy per unit time and can penetrate solutions further than continuous UV light). On the other hand, UV pulses correspond to stronger absorption than Vis or NIR pulses resulting in more effective inactivation.

SUMMARY

Embodiments of the invention provide a device that includes a shell defined by a wall having an aperture therein (the shell, therefore, enclosing a substantially closed volume) and a source of laser light configured to generate and deliver a UVC light into this volume through the aperture.

The wall is preferably characterized by Lambertian reflectance at a wavelength of the UVC light and/or the source of laser light may include an optical system configured to receive said UVC light and redirect said UVC light through the aperture.

Embodiments further provide a method for inactivation of a pathogen that includes—while utilizing an embodiment of the device identified above—exposing the pathogen disposed in a volume defined by a wall to an optical field created by a beam of the UVC light entering the volume (here, the optical field is necessarily limited to the volume and a spatial distribution of said optical field that is substantially uniform substantially at every point of the volume). In at least one implementation of the volume, the process of exposing includes exposing the pathogen located in (a) a substantially cylindrical volume limited by a wall characterized by a Lambertian reflectance, or (b) a substantially spherical volume defined by a shell characterized by the Lambertian reflectance; and/or may further include at least one of the steps of positioning the pathogen within the volume, and coupling the UVC light into the volume through the aperture. Alternatively or in addition, and substantially in every implementation of the method, the method may additionally include a step of forming the above-identified spatial distribution by multiply reflecting light at the UVC wavelength at the wall; and/or increasing an inactivation rate of the pathogen from a first inactivation rate to a second inactivation rate that is at least an order of magnitude higher than the first inactivation rater by confining said optical field to the volume, wherein the first inactivation rate is an inactivation rate achieved when directly illuminating the pathogen with said beam of light, wherein the second inactivation rate is an inactivation rate achieved when not shining said beam of light onto a pathogen directly; and/or having the step of exposing not include a step of directly illuminating the pathogen with said beam of light; and/or having the step of exposing include illuminating the pathogen only with light diffusely scattered by the wall.

BRIEF DESCRIPTION OF THE DRAWINGS

The invention will be more fully understood by referring to the following Detailed Description of Specific Embodiments in conjunction with the Drawings, of which:

FIG. 1A: Schematic of the direct exposure of pulsed UV laser on a droplet of virus solution in a vial. FIG. 1B: Schematic of the use of an embodiment of the device: the exposure of a droplet of virus, placed inside the cavity at the location of aperture a2 with UVC laser radiation. FIG. 1C: An image of the cavity with a virus droplet inside a vial. FIG. 1D: An image of the cavity filled with UV laser light and the reflection of fluorescence from the 2nd pass and multipass scattering as two bright spots on a white observation card, placed at the a2 aperture. FIGS. 1F, 1G: AFM height images of the untreated (U) and UVC-laser treated (T) HCoV-229E virions. Scale bar is 0.3 μm. FIG. 1H: Average height and width of the untreated and treated HCoV-229E virions.

FIGS. 3A, 3B, 3C, 3D, 3E, 3F, 3G, 3H, 3I, 3J, 3K, 3L, 3M, 3N, 3O, 3P, 3Q, and 3R: SARS-CoV-2 virus was exposed either directly or with the use of an embodiment of the invention to UVC laser light. Calu-3 cells were infected 24 hours after seeding with the indicated groups of CoV-2 (0.1 MOI). (FIGS. 3A through 3L: Images were taken 48 hours post-infection using the EVOS microscope (Thermo Fisher). 200×. Scale bar=200 μm. SARS-CoV-2 N protein expression in Calu-3 cells. FIGS. 3M, 3N: At 72 hours post-infection RNA was extracted and qPCR performed. Average fold change ±SEM, compared to the negative control (NC), is shown (N=3). A 1-Way ANOVA and Dunnett's post hoc test was used to determine significance compared to 0 sec. FIGS. 3O-3P: Inflammatory marker expression in Calu-3 cells after SARS-CoV-2 infection. For the negative control, CoV-2 was exposed to UVC light under a handheld wand for 2 minutes. At 48 hours post-infection RNA was extracted and qPCR performed. Average fold change ±SEM, compared to the negative control (NC), is shown (N=3). A 1-Way ANOVA and Dunnett's post hoc test was used to determine significance compared to 0 sec. SARS-CoV-2 survival as a function of irradiation time via direct exposure (FIG. 3Q) and cavity (FIG. 3R). *=p<0.05, =p<0.01, *=P<0.001, ****=P<0.0001.

FIGS. 4A through 4F: Images were taken 48 hours post-infection using EVOS microscope (Thermo Fisher). 200×. Scale bar=200 μm. FIGS. 4G through 4H: SARS-CoV-2 N protein expression in Calu-3 cells. At 48 hours post-infection RNA was extracted and qPCR performed. Average fold change ±SEM, compared to the negative control (NC), is shown (N=3). A 1-Way ANOVA and Dunnett's post hoc test was used to determine significance compared to 0 sec. *=p<0.05, =p<0.01, *=<0.001, ****=P<0.0001.

FIG. 5A: Side view shows cavity dimensions, laser beam entrance aperture a1 and two plastic vials containing virus droplets, one at the bottom of the cavity and one on the side. FIG. 5B: Top view shows the schematic of laser beam scattering inside the cavity. A vial with a virus droplet placed at the aperture a2 is illuminated by multiply scattered beams: the 2nd pass (solid line) and one of the multipass beams (dashed line) formed by diffuse scattering inside the integrating cavity are shown.

FIG. 7A: Normalized height profiles show the comparison of the virion width. FIG. 7B: Height profiles show the comparison of the virion height.

FIGS. 9A, 9B, 9C, 9D, 9E, and 9F: HCoV-229E virus was exposed to direct UVC laser light for the indicated times. Calu-3 cells were treated 24 hours after seeding with the indicated groups of HCoV-229E (3 MOI). Images were taken 72 hours post-infection using the Keyence BZ-X800 microscope. 200×

FIGS. 11A, 11B, 11C, 11D, 11E, 11F, 11G, 11H, 11I, 11J, 11K, 11L, 11M, 11N, 11O, and 11P: Direct UVC laser light exposure (FIGS. 11A through 11H) and exposure with the use of the cavity according to the embodiment of the invention of RSV-RFP virus. Hep-2 cells were treated 24 hours after seeding with the indicated groups of RSV-RFP (1 MOI) or the negative control (NC). Images were taken 72 hours post-infection using the Keyence BZ-X800 microscope at 200×.

FIGS. 12A, 12B, 12C, 12D, 12E, 12F, 12G, 12H, 12I, and 12J, RSV-RFP virus was exposed to direct UVB or UVC laser light for the indicated times. Hep-2 cells were treated 24 hours after seeding with the indicated groups of RSV-RFP (1 MOI). Images were taken 96 hours post-infection using the Keyence BZ X800 microscope. 200×.

FIGS. 13A, 13B, 13C, and 13D: RSV-RFP virus was exposed to UVC lamp (Stratalinker) irradiation for the indicated times. Hep-2 cells were treated 24 hours after seeding with the indicated groups of RSV-RFP (1 MOI). Images were taken at 96 hours post-infection using the Keyence BZ-X800 microscope. 200×.

Figures 1A, 1B, 1C, 1D, 1E, 1F, 1G, 1H:
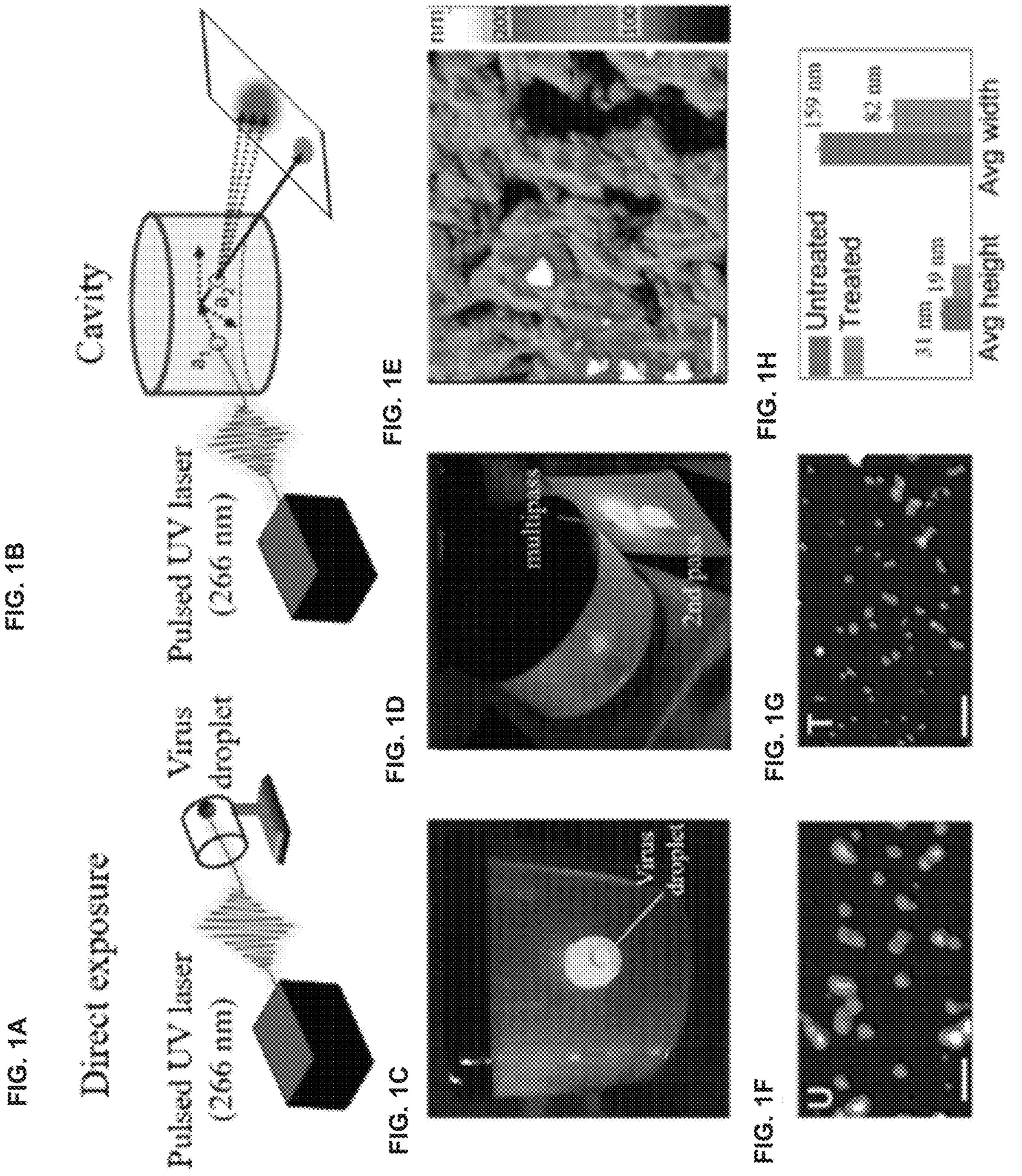
FIGS. 1A, 1B, 1C, 1D, 1E, 1F, 1G, and 1H illustrate virus inactivation with the use of UVC light.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

A person of skill in the art will appreciate that light absorption could be enhanced by coupling UV pulsed lasers to integrating cavities (ICs). Indeed, a typical IC has spherical geometry and walls made of highly reflective diffuse scattering materials, the Lambertian light scattering from which may be employed to generate substantially uniform optical field distribution inside the IC and large effective optical path lengths. Even though various UV boxes and cavities have previously been used for pathogen inactivation, the virucidal properties of ICs have not been much explored. As a skilled artisan knows, a Lambertian characteristics of a light source—including a passive light source—it that in which the emitted radiance is independent of the observation direction, while the cosine law holds for the radiant intensity sent into different directions. (Lambertian reflectance, for example, is the property that defines an ideal "matte" or diffusely reflecting surface. The apparent brightness of a Lambertian surface to an observer is the same regardless of the observer's angle of view. More technically, the surface's luminance is isotropic, and the luminous intensity obeys Lambert's cosine law. See, for example, en.wikipedia.org/wiki/Lambertian_reflectance)

The idea of the present invention stems from the realization that the operational advantage, provided by the diffuse scattering nature of an IC over the specular scattering of a conventional cavity manifests in a larger range of illumination angles that may reduce the shielding of viruses by microparticles and, therefore, can result in destruction of a virus more efficiently in reduced time.

According to the idea of the invention, a new virus and/or pathogen (which terms are used herein interchangeably) inactivation device has been devised based on a pulsed nanosecond 266 nm UV laser coupled to an integrating cavity, which is referred to herein as Laser Integrating Cavity Device (or, LICD).

A persisting problem of related art in the field of UV inactivation of viruses, stemming from the deficiencies of the conventionally used UV lamps (which have limited efficiency and have to operate at high powers, large doses, and long irradiation times in order to produce the desired effect) is solved by devising a UV-light based pathogen inactivation methodology that employs a pulsed nanosecond UVC laser optically coupled with an integrating cavity (IC) having walls characterized by a nearly Lambertian reflection of light. The walls of the IC—in at least one implementation—includes a UV reflective material, polytetrafluoroethylene. This approach demonstrated efficient inactivation of several respiratory viruses including SARS-CoV-2, at ~1 millisecond effective total irradiation time (which represent >3 orders of magnitude increase in efficiency as compared with conventional methodology).

Figure 5B:
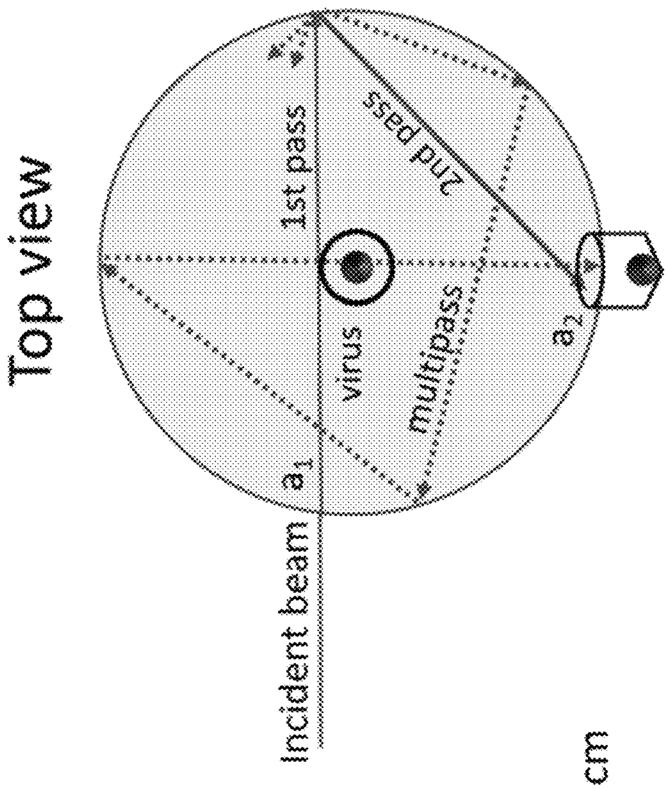
FIGS. 5A, 5B: Schematic of the integrating cavity employed with an embodiment of the invention.
Figure 5A:
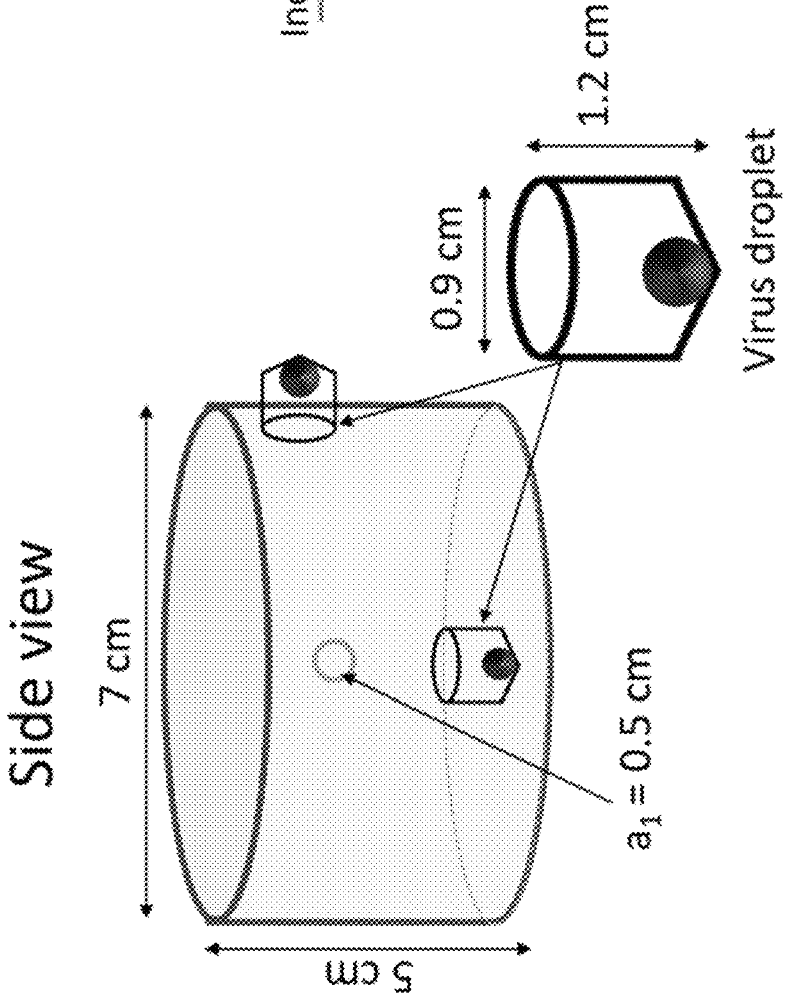

Two different methods of exposure of a pathogen to laser light were investigated: (1) a direct exposure of the virus to the UV laser beam (schematically illustrated in FIG. 1A); and (2) an indirect exposure of the virus, located at a random point inside the LICD enclosure, to the same working light, FIG. 1B The LICD was configured by coupling the laser light at 266 nm UVC laser to a cylindrical IC enclosure with walls made of highly UV reflective polytetrafluoroethylene (PTFE) coating and possessing a nearly Lambertian reflectivity. Detailed schematics and spatial dimensions of LICD are illustrated in FIGS. 5A, 5B For the direct exposure, a plastic vial was placed horizontally as shown in FIG. 1A and a virus droplet was held at the bottom of the vial. For the exposure to the UVC light with the use of an embodiment of the invention, one vial was randomly placed at the bottom and the second vial was randomly placed on the side wall of the enclosure as shown in FIG. 1C.

After the incident laser beam is reflected from the inner wall of the enclosure, the diffusely scattered light undergoes multiple reflections, thereby uniformly filling the whole volume. The diffuse scattering efficiency can be estimated by observing the brightness of the two fluorescence spots on a white card placed at the exit aperture of the cavity (FIG. 1D). The spot from the multipass scattering is of similar brightness, indicating high diffuse reflectivity of the cavity walls. The PTFE coating has omnidirectional diffuse reflectivity of >93% due to the porous structure.

Figure 6A:
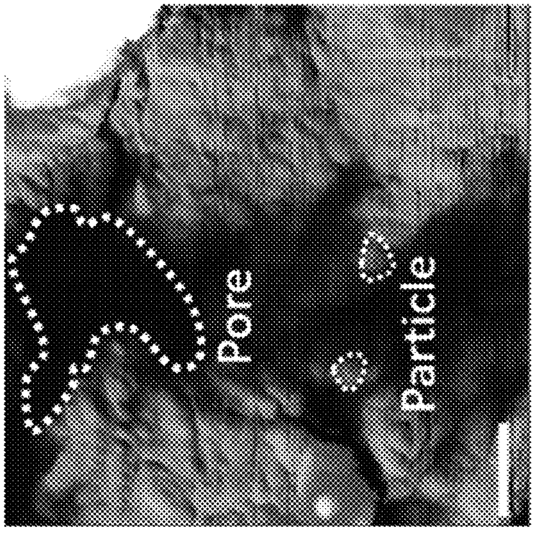
FIGS. 6A, 6B, 6C, and 6D: Atomic force microscopy (AFM) height image (FIG. 6A) of the surface topography of porous polytetrafluoroethylene (PTFE) shows the surface irregularities of the porous PTFE sheet, with average pore size of 1.86 μm and average particle size of 0.44 μm (FIG. 6B). Scale bar in FIG. 6A is 1 μm. AFM profiles of a typical particle, FIG. 6C, and pore, FIG. 6D.
Figure 6B:
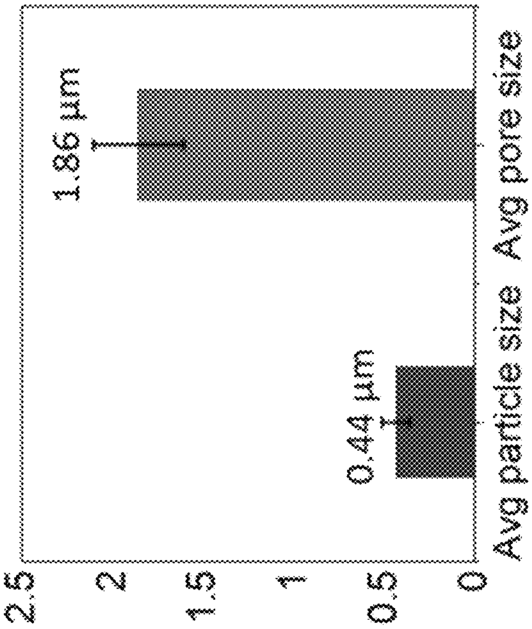
Figure 6C:
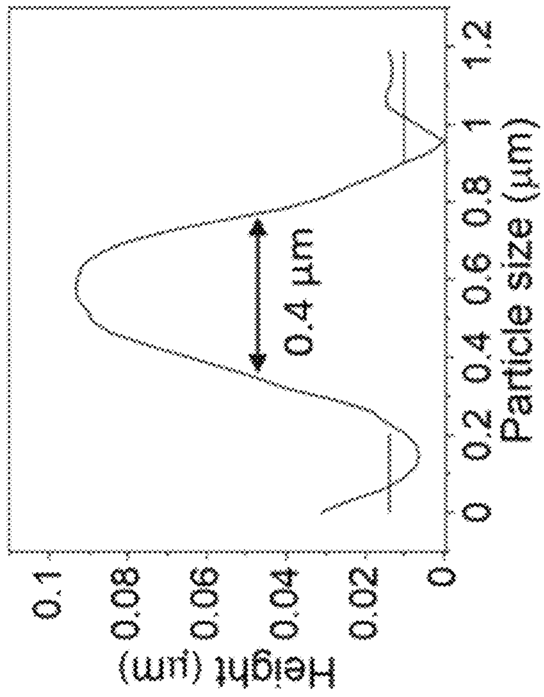
Figure 6D:
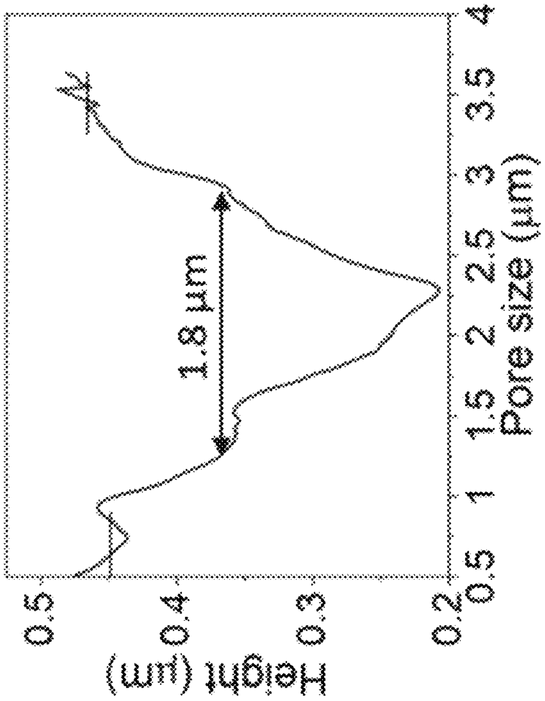
Figure 7A:
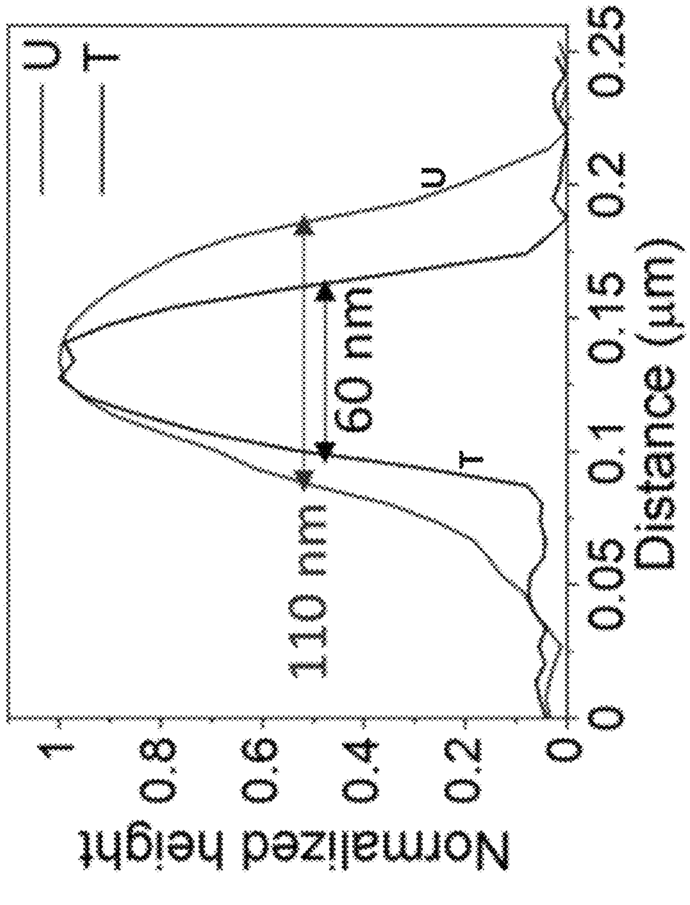
FIGS. 7A, 7B: AFM height profiles of the untreated (U) and treated with 30 min direct pulsed UV laser irradiation (T) HCoV-229E virions.
Figure 7B:
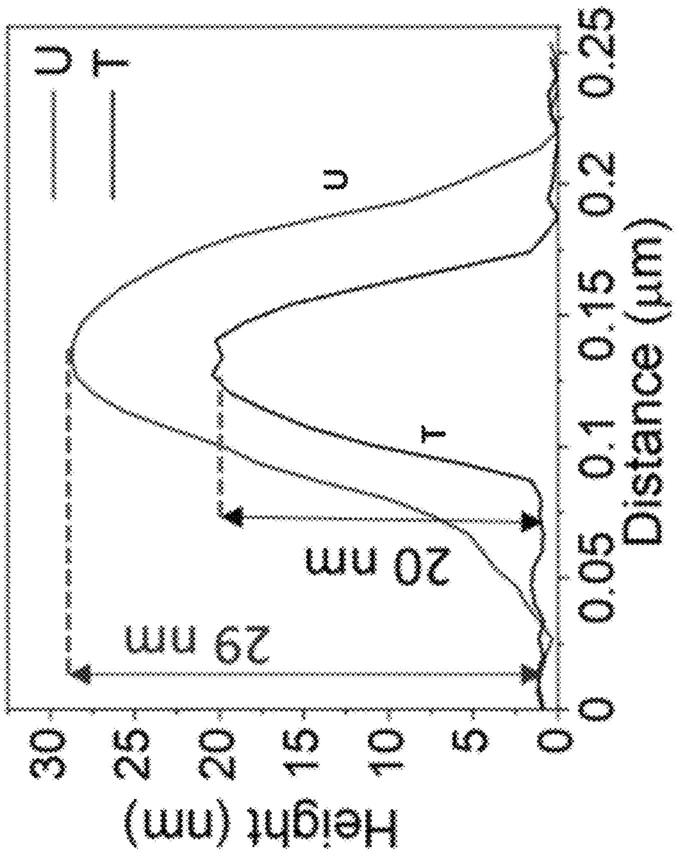

The morphological properties of the IC walls were investigated using atomic force microscopy (AFM). FIG. 1E illustrates the AFM height image of the PTFE sheet used as the reflective material for the IC of the embodiment of FIG. 1B. The observed irregularities are due to the presence of nanoparticles and pores that are highlighted by white dashed lines in FIG. 6A. The results of the AFM analysis in FIG. 6B showed the average particle size of 0.44 μm and the average pore size of 1.86 μm. AFM profiles of a typical particle and a pore are shown in FIGS. 6C and 6D, respectively. To observe the morphological changes caused by the pulsed UVC laser exposure, we performed AFM measurements on the treated (irradiated by direct pulsed UVC laser) and untreated (non-irradiated) HCoV-229E virions (FIGS. 1F and 1G). The treated virus was irradiated for 30 minutes. For the statistical analysis, ten virions were selected from both treated and untreated samples. The average height of the untreated virions was ~31 nm, while the treated virions had an average height of ~19 nm (FIG. 1H). The lateral width profiles showed the average width of the untreated virions ~159 nm and of the treated virions ~82 nm (FIG. 1H). The AFM height profiles of the typical examples of the untreated (U) and treated virions are shown in FIGS. 7A, 7B. These results indicate shrinkage of the viral particles after exposure to ultrashort UVC laser pulses, confirming the contribution of the ablation mechanism to virus inactivation.

Figure 2A:
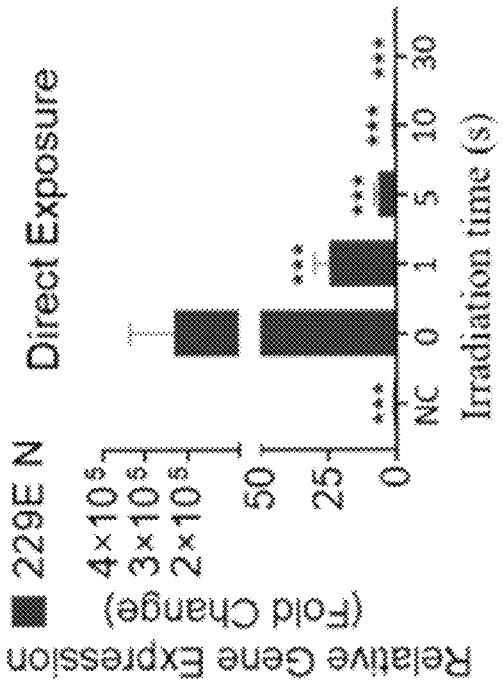
FIGS. 2A, 2B: HCoV-229E virus was exposed to direct pulsed UVC laser (FIG. 2A) and cavity (FIG. 2B) for the indicated times. Calu-3 cells were treated 24 hours after seeding with the indicated groups of 229E (3 MOI). At 72 hours post-infection RNA was extracted and qPCR performed. Average fold change ±SEM, compared to the negative control (NC), is shown (N=3). A 1-Way ANOVA and Dunnett's post hoc test was used to determine significance compared to 0 sec.
Figure 2B:
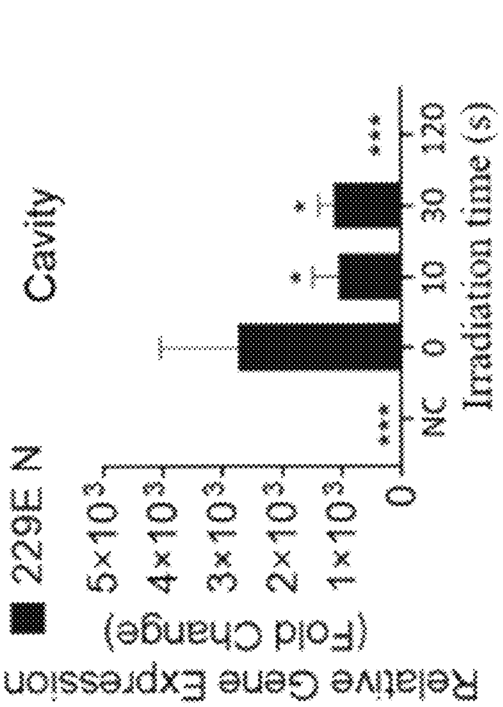
Figure 8B:
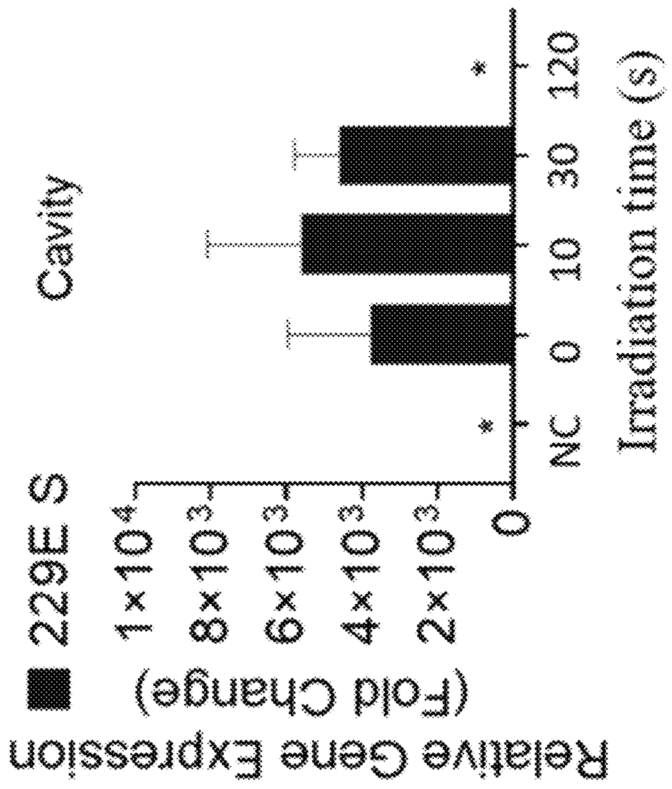
FIGS. 8A, 8B: HCoV-229E S protein expression in Calu-3 cells. HCoV-229E virus was exposed to direct UVC laser (FIG. 8A) and cavity (FIG. 8B) for the indicated times. Calu-3 cells were treated 24 hours after seeding with the indicated groups of HCoV-229E (3 MOI). At 72 hours post infection RNA was extracted and qPCR performed. Average fold change ±SEM, compared to the negative control (NC), is shown (N=3). A 1-Way ANOVA and Dunnett's post hoc test was used to determine significance compared to 0 sec. *=p<0.05, =p<0.01, *=P<0.001, ****=P<0.0001.
Figure 8A:
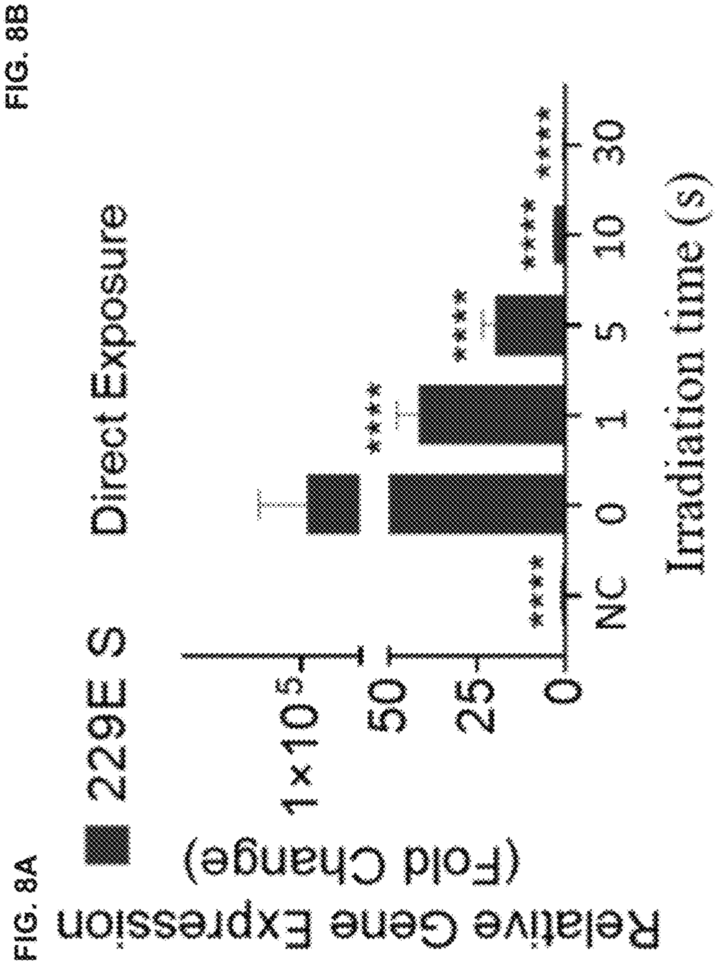

To investigate the pathogen inactivation, a direct exposure of the 266 nm nanosecond UVC laser light was used to irradiate the HCoV-229E virus. A 6 μl virus droplet in PBS was placed in a vial as described above. The laser irradiation times of 1, 5, 10 and 30 s correspond to the doses of 3.5, 17.6, 35.3 and 105.9 mJ/cm$^2$. Upon the direct exposure of UVC laser, HCoV-229E replication was completely inactivated (99.9% reduction) after 4 s exposure, which corresponds to 15.6±0.3 mJ/cm$^2$ dose, measured using qPCR for 229E spike (S) (FIG. 8A) and nucleocapsid (N) (FIG. 2A) transcripts after 72 hours of infection in Calu-3 cells. To investigate the effects of the indirect exposure to the UVC laser on viral replication inside the IC enclosure, we performed the LICD exposure of HCoV-229E virus droplet in PBS placed inside a vial at two random positions inside the IC (shown in FIG. 5) with the irradiation times of 10, 30, 120 and 1800 s, which correspond to 0.05, 0.15, 0.6, and 9 mJ/cm$^2$ doses, respectively. After the UV dose of 0.63±0.02 mJ/cm$^2$, HCoV-229E viral replication was inactivated (99.9% reduction), when measured by qPCR for 229E S (FIG. 8B) and N (FIG. 2B) proteins after 72 hours of infection in Calu-3 cells (FIGS. 9A through 9F).

Figure 2C:
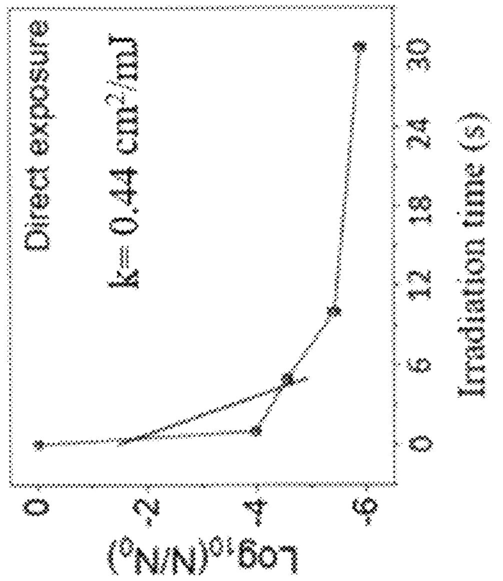
FIGS. 2C, 2D illustrate HCoV-229E survival as a function of UV irradiation time via direct exposure (FIG. 2C) and exposure with an embodiment of the invention including the cavity (FIG. 2D). *=p<0.05, =p<0.01, *=P<0.001, ****=P<0.0001.
Figure 2D:
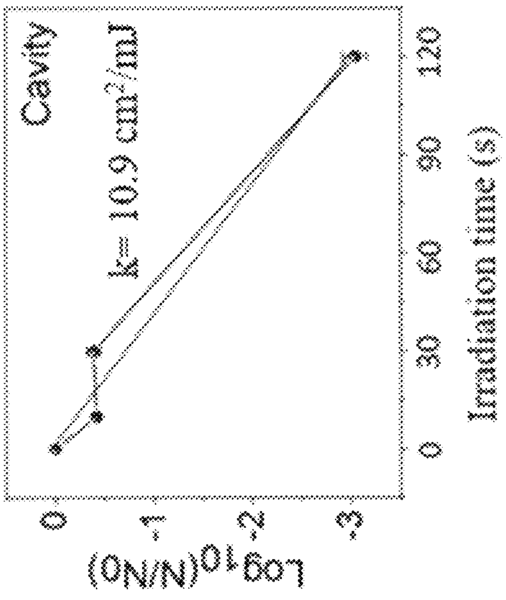

FIG. 2C contains the log-linear survival plot of the direct inactivation kinetics, where No and N are the initial and final concentrations of the infectious viral units determined from the qPCR analysis. Only the linear part of the graph was fitted in agreement with the common approach, and the small fraction of the tailing part was ignored as described in the Methods section. The linear regression fit resulted in the inactivation rate constant k=0.443±0.006 cm$^2$/mJ. FIG. 2D shows the LICD survival plot and the linear regression fitting with the inactivation rate constant k=10.9±0.4 cm$^2$/mJ. These results indicate that both direct and LICD exposure to pulsed UVC laser eradicate viral ability to replicate in host cells. However, the LICD is at least an order of magnitude more effective as it requires a lower dose to achieve similar inactivation.

Figures 3G, 3H, 3I, 3J, 3K, 3L:
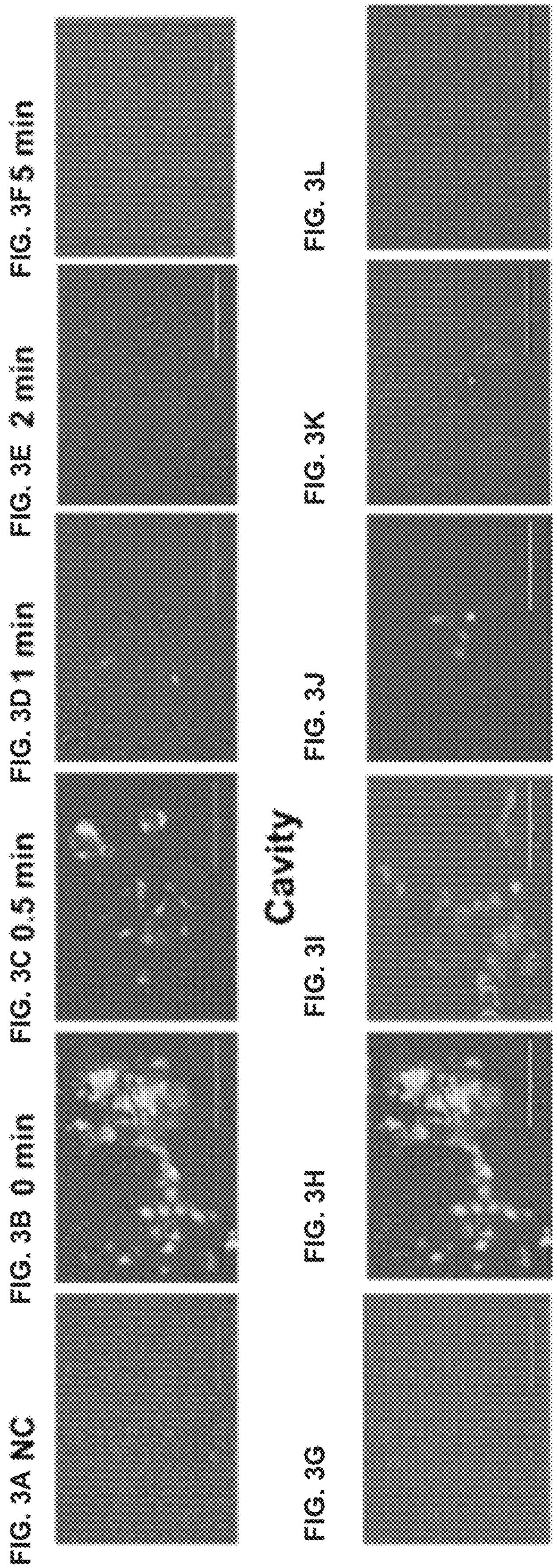
Figure 3M:
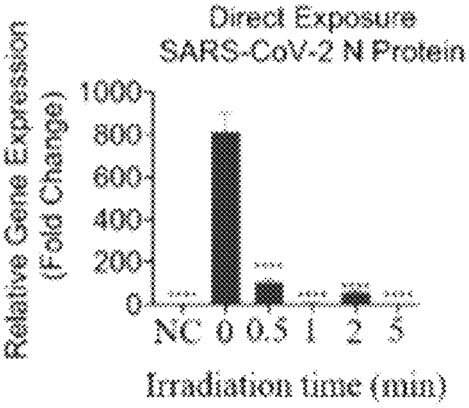
Figure 3N:
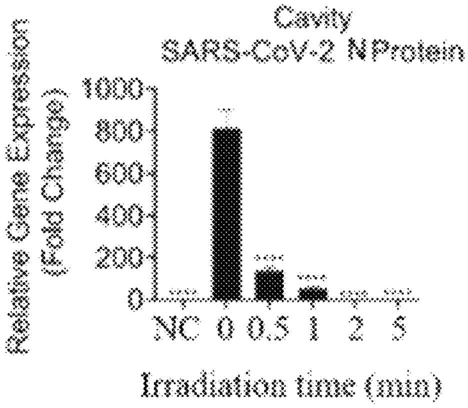
Figure 3O:
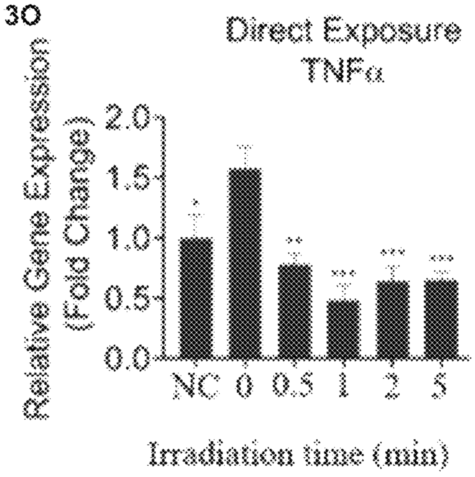
Figure 3P:
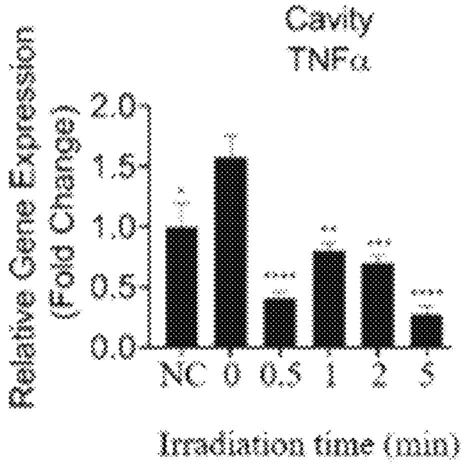
Figure 3Q:
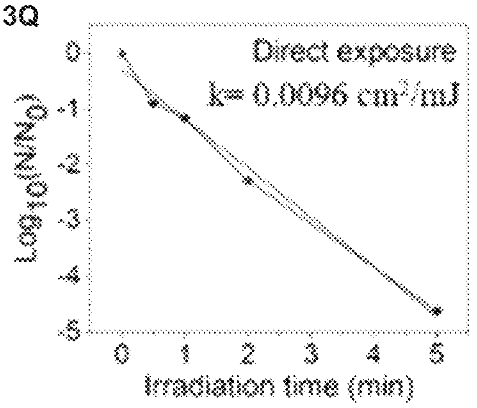
Figure 3R:
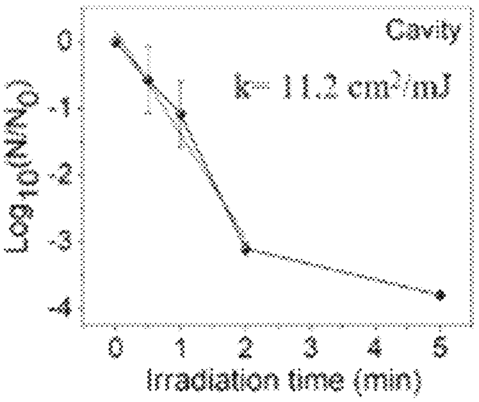
Figure 10A:
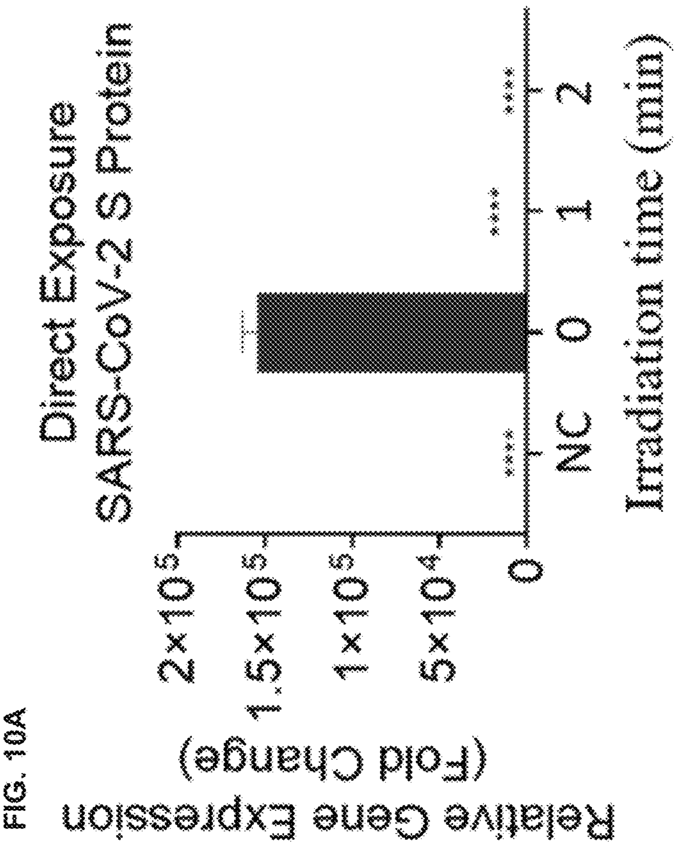
FIGS. 10A, 10B: Sars-CoV-2 S protein expression in Calu-3 cells. SARS-CoV-2 virus was exposed to direct UVC laser (FIG. 10A) and with the use of an embodiment employing the integrating cavity (FIG. 10B) for the indicated times. Calu-3 cells were treated 24 hours after seeding with the indicated groups of SARS-CoV-2 (0.1 MOI). At 72 hours post infection RNA was extracted and qPCR performed. Average fold change ±SEM, compared to the negative control (NC), is shown (N=3). A 1-Way ANOVA and Dunnett's post hoc test was used to determine significance compared to 0 sec. *=p<0.05, =p<0.01, *=P<0.001, ****=P<0.0001.
Figure 10B:
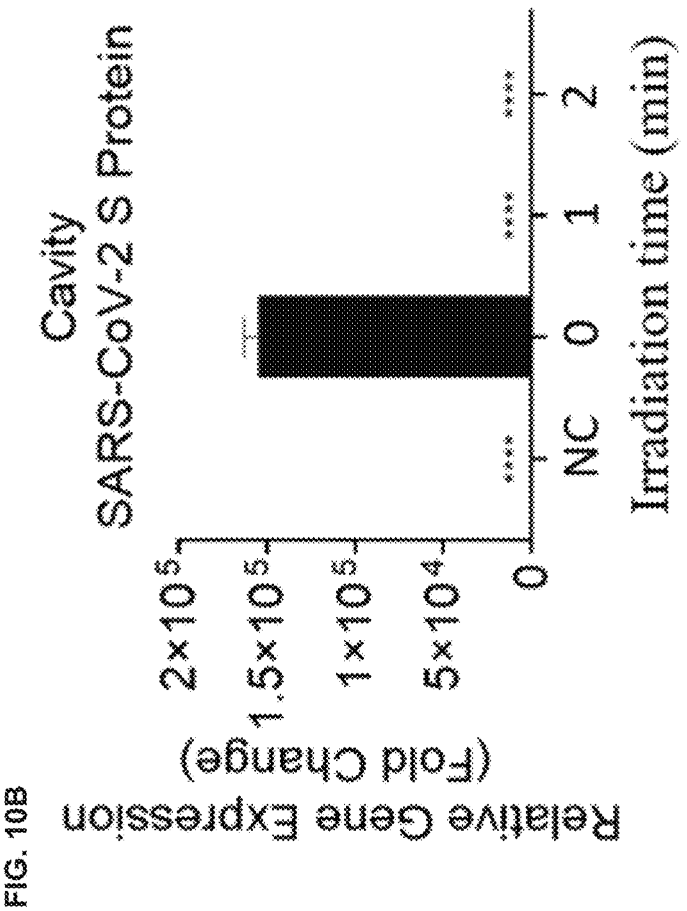
Figures 11A, 11B, 11C, 11D, 11E, 11F, 11G, 11H:
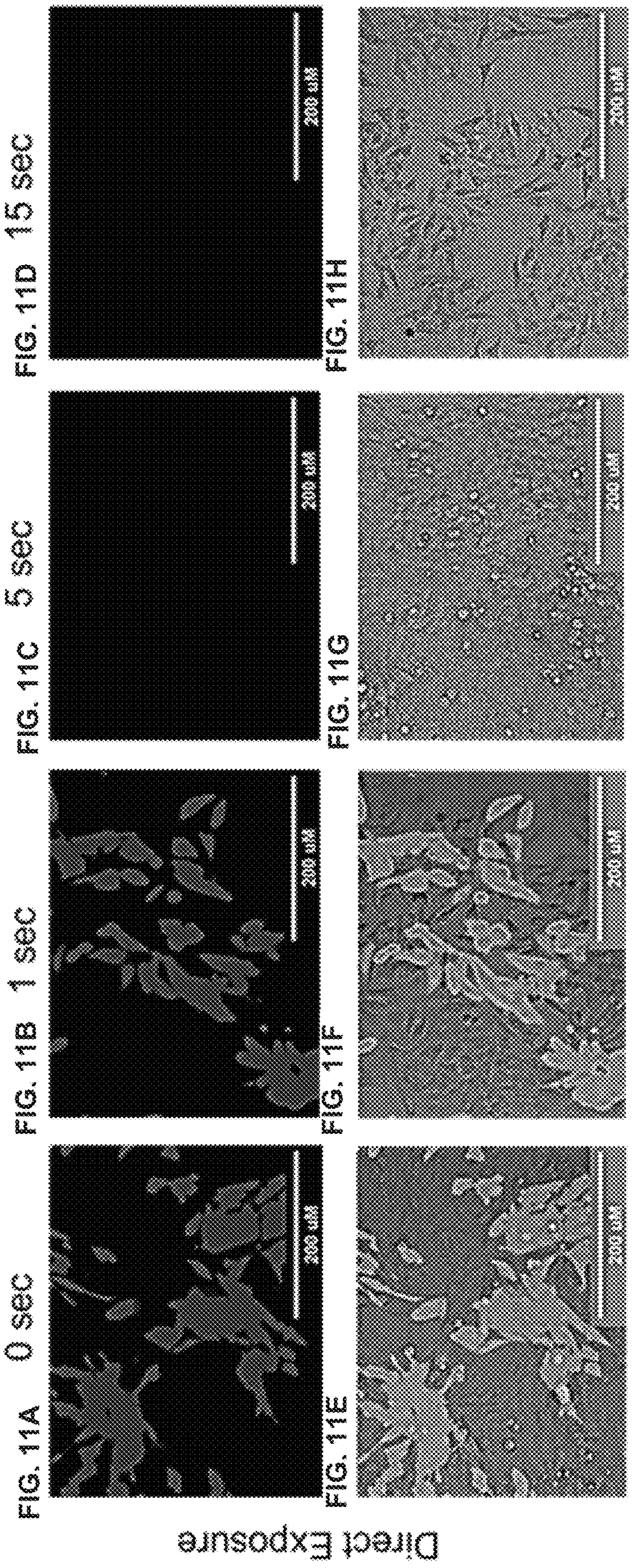
Figures 12F, 12G, 12H, 12I, 12J:
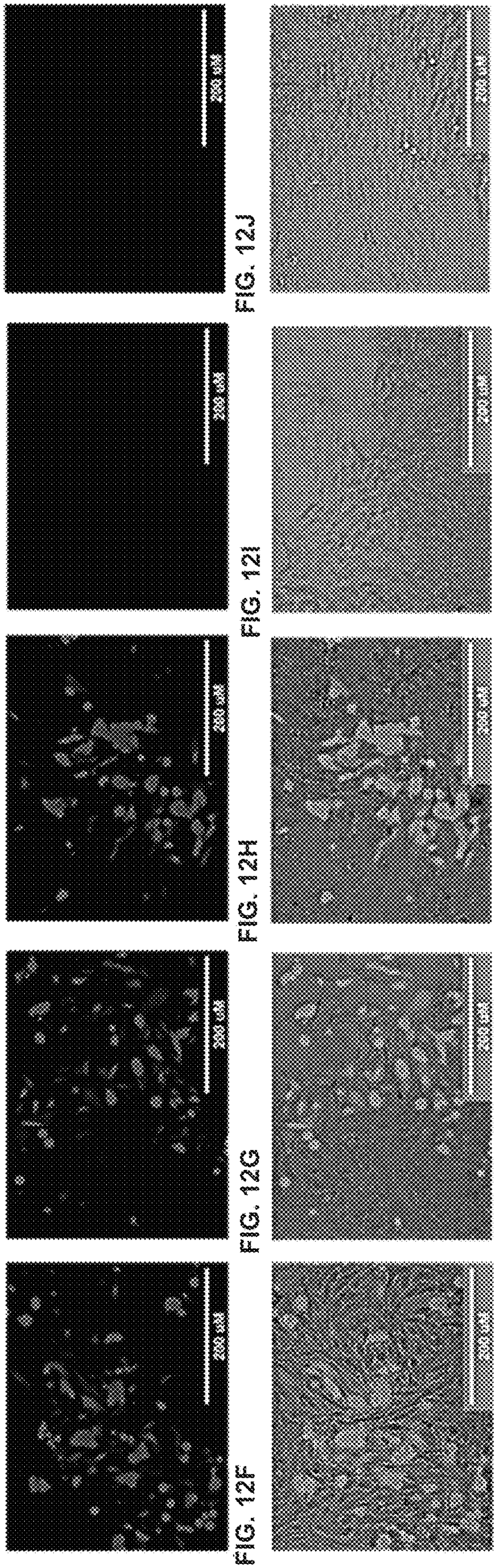
Figure 14A:
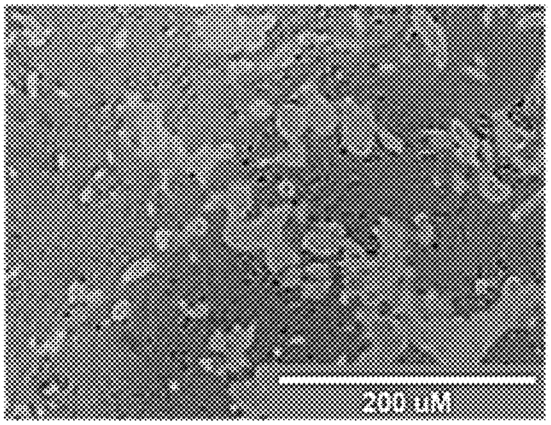
FIGS. 14A, 14B, 14C, and 14D: RSV-RFP virus was exposed to UVC lamp (Handheld Wand) for the indicated times. Hep-2 cells were treated 24 hours after seeding with the indicated groups of RSV-RFP (1 MOI). Images were taken at 96 hours post-infection using the Keyence BZ X800 microscope. 200×.
Figure 14B:
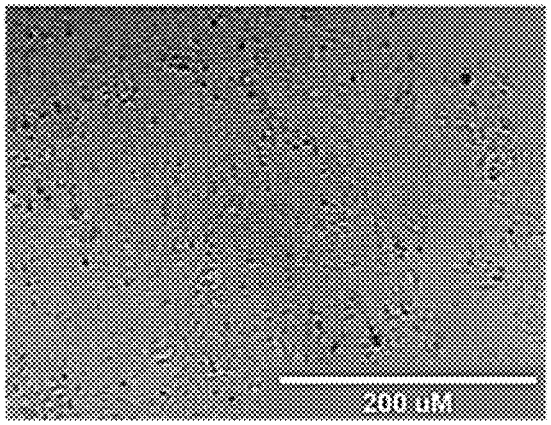
Figure 14C:
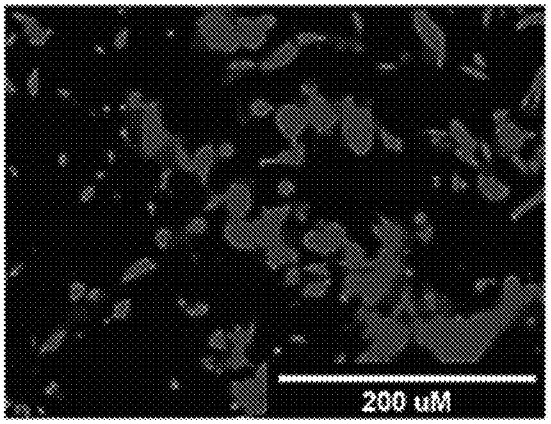
Figure 14D:
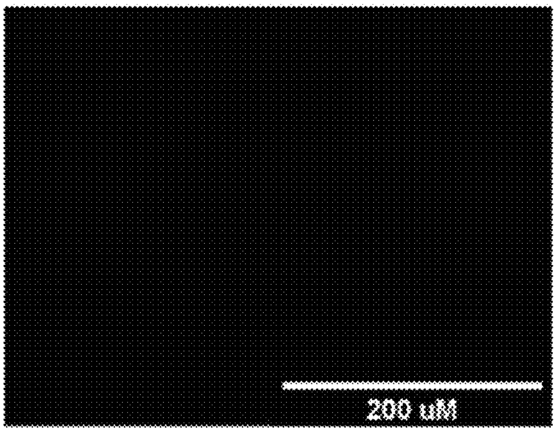

Thereafter, a direct exposure with the 266 nm nanosecond UVC laser light was used to inactivate SARS-CoV-2. Specifically, we used a 23 μl droplet of virus in PBS placed in a vial for the direct and LICD exposures as described above. The irradiation times of 30, 60, 120 and 300 s correspond to doses of 105.9, 211.8, 423.6 and 1059 mJ/cm$^2$, respectively. Upon the direct exposure of UVC laser, SARS-CoV-2 replication was completely inactivated (99.9%) after 3 min and 715 mJ/cm$^2$ dose exposure, measured using fluorescent microscopy (FIGS. 3A through 3F) and qPCR for SARS-CoV-2 S (FIG. 10A) and N (FIG. 3M) proteins after 48 hours of infection in Calu-3 cells. We then performed the LICD-based exposure of SARS-CoV-2 with the irradiation times of 30, 60, 120 and 300 s corresponding to exposure doses of 0.15, 0.3, 0.6 and 1.5 mJ/cm$^2$, respectively. After the UV dose of 0.60±0.02 mJ/cm$^2$, viral replication was inactivated (99.9% reduction was observed), when measured using fluorescent microscopy (FIGS. 3G through 3L) and qPCR for SARS-CoV-2 S (FIG. 10B) and N (FIG. 3N) transcripts after 48 hours of infection in Calu-3 cells. SARS-CoV-2 infection usually results in a pathological increase of the inflammatory protein TNF-α. However, after exposure to the UVC laser radiation both in a direct configuration (FIG. 3O) and with the use of the LICD according to an embodiment of the invention (FIG. 3P), SARS-CoV-2 infection causes significantly less TNF-α expression in Calu-3 cells. The linear regression analysis of the survival curve for the direct exposure in FIG. 1A produced the inactivation rate constant of k=0.00965±0.00004 cm$^2$/mJ. The linear regression fit for the LICD in FIG. 3R demonstrated the inactivation rate constant of k=11.2±0.1 cm$^2$/mJ. This showed that LICD was three orders of magnitude more efficient than the direct exposure.

Figures 4A, 4B, 4C, 4D, 4E, 4F, 4G, 4H:
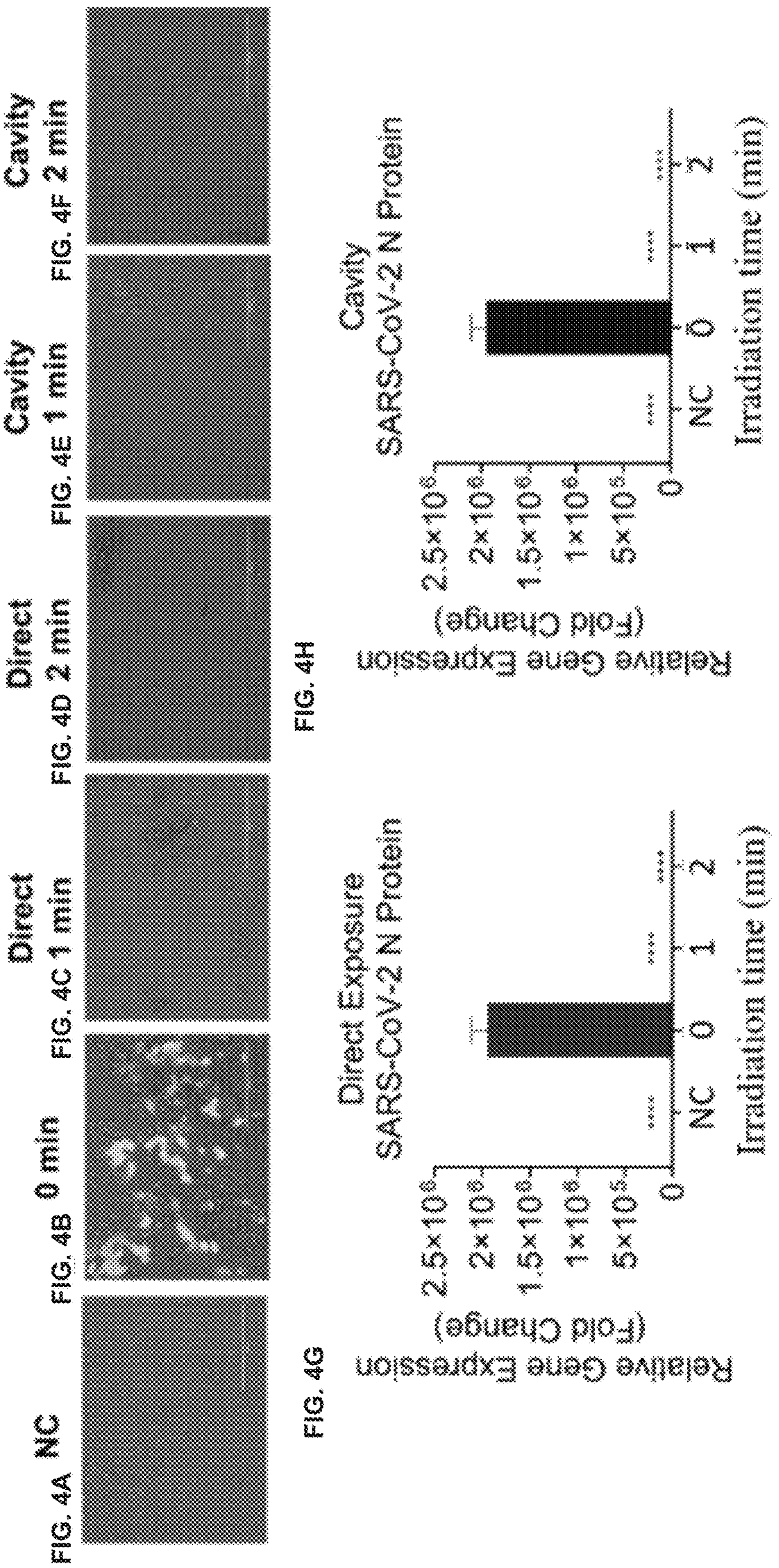
FIGS. 4A, 4B, 4C, 4D, 4E, 4F, 4G, and 4H: Reinfection of Calu-3 cells with culture supernatant from SARS-CoV-2 infected Calu-3 cells that were exposed to direct or cavity UVC laser light (see FIG. 3).

At the next step, the Calu-3 cell culture supernatant from the previously described experiment was used to reinfect a new batch of Calu-3 cells with SARS-CoV-2. The cell culture supernatant containing the SARS-CoV-2 virus was exposed to the direct laser or LICD to inactivate the virus. The laser irradiation times were 60 and 120 s with 211.8 and 423.6 mJ/cm$^2$ doses for direct exposure and 0.3 and 0.6 mJ/cm$^2$ for LICD. Upon the direct exposure to the UVC laser, SARS-CoV-2 replication was completely inactivated at 211.8 mJ/cm$^2$ dose, measured using fluorescent microscopy (FIGS. 4A-4D) and qPCR for SARS-CoV-2 N (FIG. 4G) transcript after 48 hours of infection in Calu-3 cells. After the UV dose of 0.6 mJ/cm$^2$, viral replication was inactivated in LICD, when measured using fluorescent microscopy (FIGS. 4E, 4F) and qPCR for SARS-CoV-2 N (FIG. 4H) transcripts after 48 hours of infection in Calu-3 cells. These results provided evidence that after exposure to the direct pulsed UVC laser or LCD, coronavirus samples, including SARS-CoV-2, are no longer able to cause a productive infection in cultured cells.

To test LICD on a different respiratory virus, the RSV virus expressing red fluorescent protein (RSV-RFP) was exposed to direct 266 nm nanosecond pulsed UV laser with irradiation times of 1, 5 and 15 s with corresponding doses of 3.5, 17.6 and 52.9 mJ/cm$^2$ (FIGS. 11A through 11H). A dose of 17.6 mJ/cm$^2$ resulted in a complete viral inactivation in Hep2 cells at 72 hours post infection when observed by fluorescent microscopy. RSV-RFP virus was then exposed to the LICD, which successfully inactivated RSV-RFP in Hep-2 cells at 72 hours of infection when exposed to doses as small as 0.3 mJ/cm$^2$, however a dose of 0.05 mJ/cm$^2$ also inactivated most of the virus (FIGS. 11*in* through 11P).

As a control measurement, we also directly exposed the RSV-RFP virus to a 337 nm pulsed nanosecond UVB laser (FIGS. 12A through 12J). The UVB laser irradiation had no inhibitory effect on the RSV-RFP viral replication in Hep-2 cells. These results confirm the use of UVC pulsed laser radiation for viral inactivation. We performed additional control measurements using two different cw UVC lamp sources for viral inactivation, Stratalinker unit (FIGS. 13A through 13D and a Handheld Wand (FIGS. 14A through 14D). Both UVC lamp sources were able to inactivate the RSV-RFP viral replication in Hep2 cells at 72 hours post-infection with irradiation time of 5 s and a dose of 68.5 mJ/cm$^2$, when observed by fluorescent microscopy. Due to the differences in the genome organization and composition of the non-structural proteins these three viruses allow us to demonstrate the broad range inactivation ability of the pulsed UVC laser and LICD.

Table 1 summarizes the results of the linear regression analysis of the HCoV-229E and SARS-CoV-2 inactivation kinetics. The inactivation rate constants k were obtained from the survival curves described in the Methods section. The person of skill will now appreciate that the use of an embodiment of the invention results in increasing the inactivation rate of a pathogen by at least an order of magnitude—and, depending on a specific pathogen, by as much as three orders of magnitude—as compared with that achieved when directly illumination (irradiating) the pathogen with a beam of light produced by the employed UVC light source.

TABLE 1

Linear regression parameters from fitting of the survival curves for the direct pulsed UVC laser and LICD cavity exposures of the HCoV-229E and SARS-CoV-2. Cavity enhancement factors show the increase of the inactivation efficiency of the LICD compared to the direct exposure.

| Virus | Exposure | k ($cm^2$/mJ) | $D_{90}$ (mJ/$cm^2$) | $D_{99}$ (mJ/$cm^2$) | $D_{99.9}$ (mJ/$cm^2$) | Cavity Enhancement |
|---|---|---|---|---|---|---|
| HCoV-229E | Direct | 0.44 ± 0.01 | 5.1 ± 0.1 | 10.4 ± 0.2 | 15.6 ± 0.3 | 25 |
| | Cavity | 10.9 ± 0.4 | 0.21 ± 0.01 | 0.42 ± 0.02 | 0.63 ± 0.02 | |
| SARS-CoV-2 | Direct | 0.00965 ± 0.00004 | 238 ± 1 | 476 ± 2 | 715 ± 3 | 1160 |
| | Cavity | 11.2 ± 0.1 | 0.201 ± 0.003 | 0.41 ± 0.01 | 0.60 ± 0.02 | |

Table 1 also shows the UVC dose needed to inactivate 90% ($D_{90}$), 99% ($D_{99}$), and 99.9% ($D_{99.9}$). $D_{99.9}$ represents the "complete inactivation" requiring 715 mJ/$cm^2$ for SARS-CoV-2 using the direct exposure, while only 0.6 mJ/$cm^2$ using the LICD. This difference is quantified as the cavity enhancement factor (EF) of 1160 (Table 1) given by Eq. (3) in the Materials and Methods section, below. The obtained inactivation rate constant for LICD-based exposure k=11.2 $cm^2$/mJ is more than an order of magnitude larger than the previously observed rate constants for most ssRNA viruses using UVC lamps at 254 nm and ~5 times larger than that predicted for SARS-CoV-2. On the other hand, the observed k=0.01 $cm^2$/mJ for the direct exposure is by an order of magnitude lower than the typical literature values for other ssRNA viruses using 254 nm lamps and this difference could be explained by the experimental conditions such as the relatively large droplet size of the SARS-CoV-2 solution (23 μl) and absence of stirring compared to some literature examples. These effects could lead to some light attenuation in the sample and lower k values. Note that these effects, however, do not affect the EF values, which show the increase of the inactivation efficiency due to the IC effect.

The complete inactivation (99.9%) of HCoV-229E required 15.6 mJ/$cm^2$ for the direct exposure, while only 0.63 mJ/$cm^2$ was needed using the LICD embodiment of the invention (Table 1), resulting in the EF of 25 due to the presence of the integrating cavity. The inactivation rate constant for the LICD of k=10.9 $cm^2$/mJ was similar to that of SARS-CoV-2 for LICD. However, a larger rate constant of k=0.44 $cm^2$/mJ for the direct pulsed UVC exposure of SARS-CoV-2 was obtained compared to k=0.01 $cm^2$/mJ for HCoV-229E. This difference could be attributed to a smaller droplet size (6 μl) and structural and morphological differences.

A major difference between the UVC lamp and a pulsed UVC laser exposure from the applications point of view is in the effective irradiation time, which is much shorter for the pulsed laser. The total duration of laser exposure per unit time may be obtained by multiplying the nanosecond pulse duration by a pulse repetition rate. This results in the effective total irradiation time to inactivate both HCoV-229E and SARS-CoV-2 coronaviruses of ~1 ms using LICD, while only ~0.1 ms to inactivate RSV. Similar inactivation times are required for the direct exposure but with larger doses due to the difference of the illumination areas of the direct (~0.2 $cm^2$) compared to the LICD (~200 $cm^2$).

Materials and Methods

Cell Culture:

Cell lines were purchased from the American Type Culture Collection (ATCC, Virginia USA) and passaged no more than 25 times. Cells were cultured in a humidified incubator at 37° C. in a 5% CO2 (Carbon Dioxide) atmosphere. Cells were cultured in tissue culture-treated plates in the appropriate complete cell culture media [HEP2=DMEM (GE Healthcare) containing 10% fetal bovine serum (FBS) (Atlanta Biologicals) and 1% penicillin/streptomycin (GE Healthcare)] [Calu3=MEM (GE Healthcare) containing 20% FBS, 1% non-essential amino acids (GE Healthcare), 1% 100 mM sodium pyruvate (Gibco), and 1% penicillin/streptomycin].

Viral Infection:

Three different viruses were used in these experiments. Red fluorescent protein (RFP) expressing respiratory syncytial virus (RSV-RFP) human coronavirus 229E (HCoV-229E), and SARS-CoV-2. HCoV-229E was obtained through BEI Resources, NIAID, NIH: Human Coronavirus, 229E, NR-52726. SARS-CoV-2 was provided to us by Dr. PEI-Yong Shi from the University of Texas Medical Branch, Galveston, TX, USA.[54] For all experiments, a monolayer of Hep2 (RSV-RFP) or Calu3 (SARS-CoV-2 and HCoV-229E) cells at 80% confluence was infected with various concentrations of the indicated virus MOI (as indicated in the figure legends). Cells were then incubated with the viral inoculum in Opti-MEM (Life Technologies) for 2 hours at 37° C. After this, the infectious medium was replaced by fresh growth media. Fluorescent microscopy (Keyence BZ-X800 or EVOS) was used to image cells and then the cell pellets were collected for RNA analysis.

Quantitative Reverse Transcriptase PCR (qPCR):

Total cellular RNA was extracted from cell pellets using Trizol (Thermo Fisher Scientific) according to the manufactures' protocol. RNA was quantified using the Nanodrop (Thermo Fisher Scientific). One microgram of RNA was then reverse transcribed using the Maxima cDNA Reverse Transcription Kit (Thermo Fisher Scientific) according to the manufactures' protocol. qPCR performed on the cDNA was used to quantitate the relative expression levels of certain genes to β-actin as a control. Real time analysis was performed using BlazeTaq SYBR Green qPCR Mix 2.0 (Genecoepia), according to the manufactures' protocol, in a Bio Rad CFX-384 thermocycler using primers obtained from Integrated DNA Technologies (IDT). The data was analyzed using ΔΔCt calculations and expression of all genes was normalized to □-actin expression as a housekeeping gene. Average fold change ±SEM, compared to control, was then calculated. Data analysis was performed using the CFX Maestro software (Bio-Rad).

Integrating Cavity:

The cylindrically shaped integrating cavity (IC) was constructed with the use of a high reflectance porous PTFE sheet (Thorlabs) of 0.75 mm thickness which showed UVC reflectance of >93%. The schematic diagrams and spatial dimensions are shown in FIG. 5A, 5B.

The optical path increase in the IC may be estimated using the approach of Fry, E. S. et al, Integrating cavity absorption meter; in *Applied optics* 31, 2055-2065 (1992), the disclosure of which is incorporated by reference herein. The average distance between reflections inside an integrating cavity $\bar{d}$=4.1 cm was calculated according to $$\bar{d} = 4\frac{V}{S}, \quad \text{(Eq. 1)}$$

where V is the cavity volume, and S is the surface area. The average path length inside the IC, L=63 cm was calculated via $$L = 4\frac{V}{S(1-\rho)}, \quad \text{(Eq. 2)},$$

where ρ=0.935 is the IC reflectivity estimated from the reflectivity of PTFE at 266 nm. The cavity enhancement factor (EF) for each virus was calculated as $$EF = \frac{k_{cavity}}{k_{direct}}, \quad \text{(Eq. 3)}$$

where $k_{direct}$ and $k_{cavity}$ is the inactivation rate constant for the direct and LICD exposure, described below.

UV Irradiation:

The following UV sources were used: i) Pulsed UVC source was 266 nm Nd:YAG nanosecond pulsed laser (JDS Uniphase NanoLaser™) with 1 mW average power, ~1 ns temporal pulse duration, and 10 kHz repetition rate. ii) Pulsed UVB source was 337 nm nitrogen laser (VSL-337ND) with 5.2 mW average power, <4 ns temporal pulse duration, and 10 Hz repetition rate. iii) Cw UVC lamp (Stratalinker® UV Crosslinker 1800) had 5 bulbs, 8 W each, with 254 nm wavelength. iv) Cw UVC lamp (Handheld Wand, Clear-Raze™) had a bulb of 18 W with 254 nm wavelength.

Inactivation Kinetics:

The results of inactivation experiments were analyzed using the qPCR relative gene expression data (FIGS. 2 and 3). The linear regression parameters in Table 1 were calculated using the first order kinetics given by:

$$\ln(N/N_0) = -k\,D \quad \text{(Eq. 4)},$$

where $N/N_0$ is the survival fraction, N is the relative gene expression at each UV dose (D), and $N_0$ is the relative gene expression at zero dose. The experiments were carried out in 3 replicates for HCoV-229E and 4 replicates for SARS-CoV-2. The inactivation rate constant, k ($cm^2/mJ$), was calculated for each virus strain and for both direct and LICD exposures. The load reduction doses to inactivate 90% ($D_{90}$), 99% ($D_{99}$) and 99.9% ($D_{99.9}$) of the virus are given by $$D_{90} = \frac{-\ln[1-0.9]}{k}, \quad \text{(Eq. 5)}$$

$$D_{99} = \frac{-\ln[1-0.99]}{k}, \text{ and} \quad \text{(Eq. 6)}$$

$$D_{99.9} = \frac{-\ln[1-0.999]}{k}. \quad \text{(Eq. 7)}$$

AFM Measurements:

Viral drops were inactivated using 10% phosphate-buffered formalin for 20 mins and washed using phosphate-buffered saline (PBS). Atomic force microscopy (AFM) measurements (OmegaScope®, Horiba Scientific) were performed using a Si tip (Micromash) in the tapping mode with 20 nm average tip-sample distance on virus deposited on $SiO_2$/Si substrate by drop casting. A 2 μm*2 μm scanning area was chosen for AFM, which comprised of several virions, out of which 10 virions were selected to calculate and compare the height and the width of the treated and untreated virions.

Statistics:

Experiments have been repeated at least twice with three or four replicates. When comparing multiple groups, statistical significance for each experiment was determined using Analysis of variance (ANOVA) and the Dunnett's post hoc test, *=p<0.05, =p<0.01, *=P<0.001, ****=P<0.0001. Calculations were performed and graphs produced using Prism 6.0 software (GraphPad). Graphs of results show the mean and error bars depict the mean plus or minus the standard error of the mean.

Abbreviations

AFM Atomic force microscopy
ANOVA Analysis of variance
$CO_2$ Carbon Dioxide
COVID-19 Coronavirus disease-19
EF Enhancement factor
FBS Fetal bovine serum
HCoV-229E 229E Coronavirus
HuEV Human enteroviruses
ICs Integrating cavities
LIC- Ultraviolet laser coupled to an integrating cavity
LEDs Light emitting diodes
N Nucleocapsid
Nd:YAG Neodymium-doped yttrium aluminium garnet
NIR Near-infrared light
PBS Phosphate buffered saline
PTFE Polytetrafluoroethylene
qPCR Quantitative polymerase chain reaction
RNA Ribonucleic acid
RFP Red fluorescent protein
RSV Respiratory syncytial virus
S Spike
ssRNA Single-stranded Ribonucleic acid
SARS-CoV-2 Severe Acute Respiratory-Syndrome Coronavirus-2
TNF-α Tumor necrosis factor alpha
VEE Venezuelan equine encephalomyelitis
Vis Visible light
UV Ultraviolet Overall, fast inactivation of a pathogen on surfaces and in contained air was demonstrated with the use of a pulsed 266 nm nanosecond UVC laser utilized as part of a broad anti-viral LIC device. A comparison of our novel ultrafast UVC laser-based air filtering system, the LICD, fabricated using a highly UV diffuse scattering material PTFE, with the direct exposure of the UVC laser beam, demonstrated that efficient viral inactivation after exposure to both direct laser beam and LICD. The time needed for inactivation might be further reduced by increasing the laser power by using additional optics elements and improving the diffuse reflecting properties of the device with more advanced reflective materials. Also, beyond viral inactivation, the application of LICD may be extended to other pathogens such as UV inactivation of bacteria and mold in the future.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

The invention claimed is:

1. A method for inactivation of a pathogen, comprising:

using a device that comprises (a) a shell defined by a wall having an aperture therein, the shell enclosing a volume and (b) a source of laser light configured to generate and deliver a UVC light into said volume through the aperture, performing the following steps:

exposing the pathogen disposed in the volume to an optical field created by a beam of said UVC light entering the volume, wherein the optical field is necessarily limited to said volume and that has a UVC wavelength, wherein a spatial distribution of said optical field that is substantially uniform substantially at every point of the volume;

and increasing an inactivation rate of the pathogen from a first inactivation rate to a second inactivation rate that is at least an order of magnitude higher than the first inactivation rate by confining said optical field to the volume, wherein the first inactivation rate is an inactivation rate achieved when directly illuminating the pathogen with said beam of the UVC light, wherein the second inactivation rate is an inactivation rate achieved when not shining said beam of the UVC light onto a pathogen directly.

2. A method according to claim 1, wherein said exposing includes exposing, to said optical field, the pathogen disposed in (a) a substantially cylindrical volume limited by a wall characterized by a Lambertian reflectance;

or (b) a substantially spherical volume defined by a shell characterized by the Lambertian reflectance.

3. A method according to claim 1, further comprising:

positioning the pathogen within the volume, and coupling light at said UVC wavelength into the volume through the aperture.

4. A method according to claim 1, further comprising forming said spatial distribution by multiply reflecting light at said UVC wavelength at the wall.

5. A method according to claim 1, wherein said exposing does not include directly illuminating the pathogen with said beam of the UVC light.

6. A method according to claim 1, wherein said exposing includes illuminating the pathogen only with light diffusely scattered by the wall.

* * * * *